3,325,459
SHEET MATERIALS
Robert J. Gander, Whitehouse, N.J., assignor to Johnson & Johnson, a corporation of New Jersey
Filed Aug. 1, 1963, Ser. No. 299,303
6 Claims. (Cl. 260—80.5)

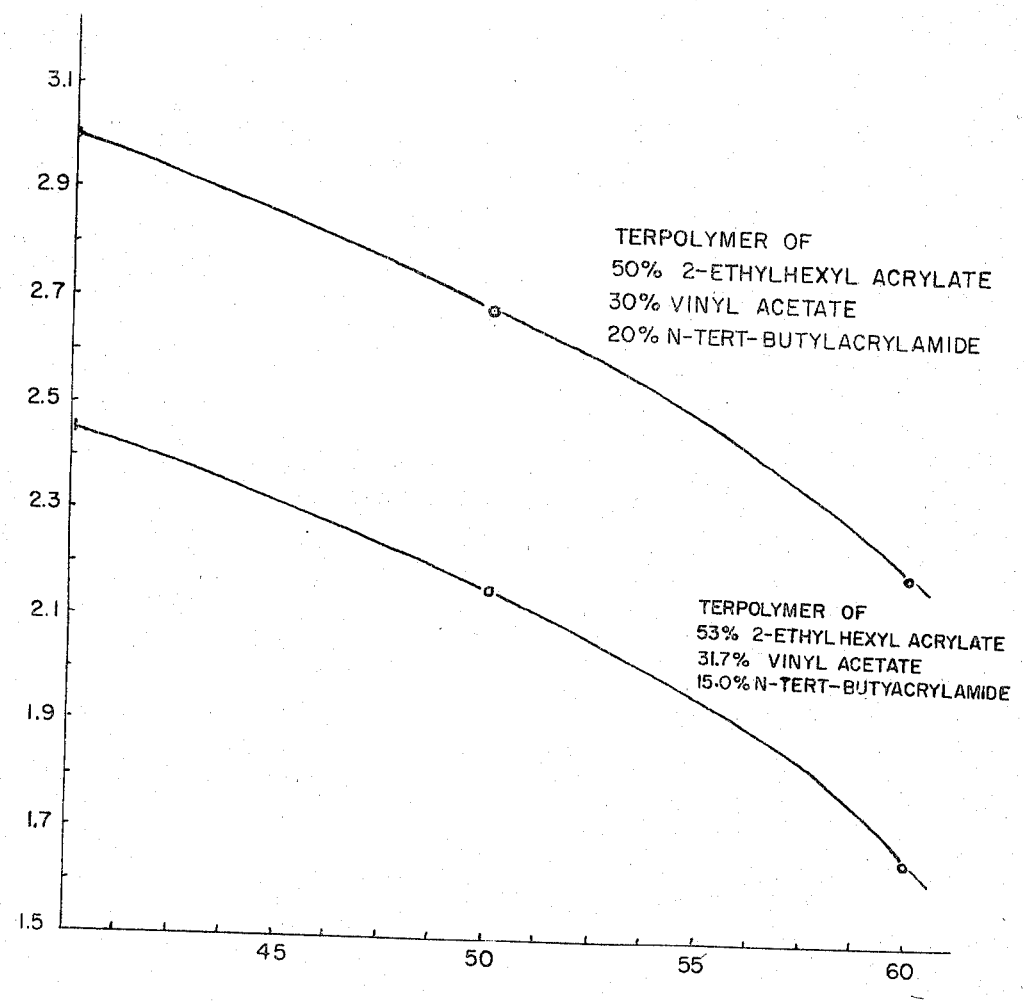

The present invention relates to pressure-sensitive adhesives and pressure-sensitive adhesive coated sheet materials wherein the pressure-sensitive adhesive is an acrylate adhesive.

By acrylate pressure-sensitive adhesives are meant the tacky homopolymers of alkyl esters of acrylic acid, as well as interpolymers of such alkly acrylates with other polymers and monomers containing a polymerizable ethylenic linkage. Acrylate pressure-sensitive adhesives are attractive for use in surgical adhesive products for a number of reasons. Being compounded of a single chemical individual instead of being compounded from a number of individual components, as are conventional rubber-base pressure-sensitive adhesives, acrylate adhesives are potentially less irritating. Also, acrylates are water-white and are extremely stable to influences of heat, light and age when compared to the more conventional rubber adhesives. Acrylate pressure-sensitive adhesives have the further advantage of sticking to perspiring skin somewhat better than the conventional rubber-base adhesives and, generally, of being somewhat less painful to remove from skin than are the conventional rubber-base adhesive compositions.

The acrylate pressure-sensitive adhesives are generally prepared by polymerizing the homopolymers or interpolymers in a solvating medium. The polymer pressure-sensitive adhesive acrylate, which is in solution in the solvating medium, is then spread while still in solution, after adjusting through the evaporation or the addition of further solvent to the desired consistency, on the backing wherewith it is to be used. The solvent is then evaporated leaving the pressure-sensitive acrylate polymer coating.

It has been the practice to use as the solvating medium conventional solvating solvents such as methyl ethyl ketone, ethyl acetate, and benzene. For use as a pressure-sensitive adhesive, it is generally desirable that the acrylate polymer have a polymer plasticity of at least 1.50 mm. in order to make a satisfactory pressure-sensitive adhesive coating. The plasticity is determined as the height of a 2.00-gram pellet of adhesive after it has been pressed between the plates of a parallel-plate plastometer, bearing a five kilogram load, for 15 minutes at 100° F. There is generally no particularly difficulty in obtaining acrylate polymer pressure-sensitive adhesives having plasticities of at least 1.50 mm., where the polymerization is carried out in the conventional solvating materials referred to. However, one of the difficulties with these solvents is that the pressure-sensitive adhesive acrylate polymers apparently have a substantial affinity for the same so that it is somewhat difficult to remove substantially all of the solvent from the acrylate polymer pressure-sensitive adhesive. All of the solvent can be removed if sufficient drying time at elevated temperatures is employed. However, where the acrylate polymer is spread from the conventional solvating solvents of the type referred to on polyvinyl film backing, the polyvinyl film backing tends to absorb a substantial portion of the solvating solvent from the acrylate pressure-sensitive adhesive mass with the result that the vinyl backing is overly softened by the presence of the solvent absorbed. It is very difficult if not almost impossible to remove the solvating solvent thus absorbed by the polyvinyl backing through conventional solvent evaporation processes. Removal of such solvents from the vinyl film is a very slow, diffusion-controlled process. Another difficulty encountered when using acrylate pressure-sensitive adhesives with vinyl film backings, or other film backings that contain a plasticizer, is that the acrylate pressure-sensitive adhesives apparently have a very high affinity for the generally used plasticizers, the affinity for the plasticizer being substantially greater than that of the plasticized film backing with the result that substantial amounts of the plasicizer are drawn out of the plasticized film backing and into the acrylate pressure-sensitive adhesive, thus overly softening the same. This occurs not only with the conventional monomeric plasticizers but also with the polymeric plasticizers which have heretofore been found to be generally stable with respect to the conventional rubber-base pressure-sensitive adhesives where the same are spread on a vinyl film backing plasticized with such polymeric plasticizers. This excessive migration of plasticizer into acrylate pressure-sensitive adhesives is well illustrated by the following experiment.

Using a 3-mil vinyl film plasticized with 37% by weight polyester plasticizer (made from neopentol glycol and adipic acid and having a number-average molecular weight of 1200 to 1300), tapes are made by coating with a conventional rubber-base adhesive and a typical acrylate adhesive (a copolymer of 63% 2-ethylhexyl acrylate and 37% vinyl acetate). After aging at 100° F. for one month, the gain in weight of the rubber-base adhesive, due to plasticizer migration, is found to be only 0.4 weight percent while that of the acrylate is found to be 9.1 weight percent. One way to compensate for this excessive migration of plasticizer from the plasticized film backing into the acrylate pressure-sensitive adhesive would be to use a pressure-sensitive adhesive which had a Williams plasticity substantially above 1.50 mm. to begin with so that the migration of the plasticizer from the plasticized film backing into the pressure-sensitive adhesive, although it would still tend to soften the pressure-sensitive adhesive, would not reduce the plasticity of the pressure-sensitive adhesive below about 1.50 mm. I have, for example, discovered that if pressure-sensitive adhesive acrylates having a Williams plasticity between 2.5 and 3.5 mm. are used as the pressure-sensitive adhesive coating on the plasticized film backing, the acrylate polymers being made in the manner hereinafter described, excellent pressure-sensitive adhesive tapes can be obtained using plasticized vinyl film backings, the pressure-sensitive acrylate adhesive mass remaining in excellent condition and not becoming overly softened even after extended periods of aging and even at elevated temperatures of 100–120° F.

It is an object of the present invention to make acrylate polymer pressure-sensitive adhesives which are readily separable from the solvating medium. It is a further object of the present invention to make acrylate polymer pressure-sensitive adhesives which, besides being separable from the solvating medium, have a plasticity in excess of 1.50 mm. It is a still further object of the present invention to make pressure-sensitive acrylate polymers by polymerization in a solvating medium which is not only readily removable from the pressure-sensitive acrylate polymers but which is also readily removable from such acrylate pressure-sensitive adhesive polymers after being spread onto a vinyl film backing. It is a still further object of the present invention to prepare pressure-sensitive acrylate adhesives having Williams plasticities in excess of 2.5 mm. by solvent polymerization in solvents which are readily removed from the resulting pressure-sensitive adhesive acrylate polymer and from vinyl film backings on which the same may be spread. Other objects and advantages of this invention will become apparent from the following description taken in connection with the specific examples set forth herein by way of illustration and example of certain embodiments of this invention.

I have discovered that if an aliphatic solvent is used as the solvating system for carrying out the polymerization in forming the acrylate pressure-sensitive adhesives, the aliphatic solvent can be removed substantially more readily from the resulting acrylate polymer than can the conventional solvating solvents heretofore referred to. Thus, for example, when cyclohexane, my preferred solvating solvent, is used, it is found that the cyclohexane can be substantially all removed from the pressure-sensitive adhesive acrylate polymers. Also, I have discovered that the aliphatic solvents, such, for example, as the cyclohexane, are not as readily absorbed by vinyl films and that where absorbed can be relatively easily removed through conventional drying operations. Thus, a single pass through a drying oven at 240° F. where the dwell time of the adhesive in the oven is about two minutes, removes all of the cyclohexane from the film. If ethyl acetate or methyl ethyl ketone were the solvent, even repeated passages through the oven would not remove all of the solvent from the film, and the film would remain softer and more elastic than desired due to the plasticizing action of the solvent. However, although the polymerization reactions can be carried out in the aliphatic solvent to give tacky or pressure-sensitive acrylate polymers, the acrylate polymers obtained are consistently too low in plasticity to be satisfactory for use as pressure-sensitive adhesives.

The nature of the problem is well illustrated in Table I which summarizes plasticities obtained for six different acrylate copolymer systems. These are polymerized in cyclohexane at a reflux temperature of about 80–82° C. using benzoyl peroxide as the initiator at a concentration 0.5% on the monomer. The weight ratio of monomers to cyclohexane in these polymerizations is 47/53. Conversions of monomer to polymer are more than 90% in each case.

TABLE I

| Polymer composition: | Polymer plasticity, mm. |
|---|---|
| 63% 2-ethylhexyl acrylate, 37% vinyl acetate | 1.08 |
| 60% 2-ethylhexyl acrylate, 40% methyl acrylate | 0.89 |
| 70% 2-ethylhexyl acrylate, 30% methyl methacrylate | 1.09 |
| 80% lauryl methacrylate, 20% methyl methacrylate | 0.93 |
| 50% lauryl methacrylate, 50% methyl acrylate | 1.30 |

After numerous attempts to make high plasticity acrylate pressure-sensitive adhesive in aliphatic solvents, it was finally discovered that if N-tert.-butylacrylamide were included as one of the monomers in the reactants, not only could pressure-sensitive adhesive acrylate polymer compositions be obtained with plasticities sufficiently high to permit their use as pressure-sensitive adhesives, but pressure-sensitive adhesives having plasticities well above 2.50 mm. could be obtained which in turn could be used with plasticized film backings to give acrylate pressure-sensitive adhesive coated films having excellent pressure-sensitive adhesive characteristics after equilibrium has been reached between the pressure-sensitive adhesive and the plasticized film backing. It was further discovered that although the N-tert.-butylacrylamide appears to be unique in the wide range of plasticities that could be obtained using the same where polymerization is carried out in an aliphatic solvent, other monomers with strong hydrogen bonding properties, such, for example, as acrylamide and acrylic acid, when added to the monomer system to be polymerized in the aliphatic solvent, would also increase the plasticity of the acrylate pressure-sensitive polymer obtained to where it is above 1.50 mm. which is, as previously indicated, the minimal plasticity which should be used for a pressure-sensitive adhesive, particularly where the same is to be used for skin adhesion. However, although acrylate pressure-sensitive adhesives having plasticities sufficiently high for use as pressure-sensitive adhesives can be obtained through the inclusion of such other monomers having strong hydrogen bonding properties, these other monomers with strong hydrogen bonding properties when added to a polymerizable acrylate system still fail to give pressure-sensitive adhesive acrylates with plasticities in excess of 2.00 mm. which are also soluble in aliphatic solvents. However, the inclusion of such other monomers, as acrylamide and acrylic acid, with strong hydrogen bonding properties in a polymer reaction system in an aliphatic solvent is part of the present invention, although the preferred monomer with strong hydrogen bonding properties is the N-tert.-butylacrylamide.

The effectiveness of the inclusion of the monomers with strong hydrogen bonding properties in increasing the plasticity of the acrylate polymer, where the polymerization is carried out in an aliphatic solvating medium, is well illustrated by the following table. The polymerizations, in making the materials of Table II, are conducted as before at about 80–82° C. in cyclohexane using 0.5% benzoyl peroxide based on the monomer. Conversions of monomer to polymer are above 95%.

In the table below, the 2-ethylhexyl acrylate-vinyl acetate monomer system is used to which is added the monomer having the strong hydrogen bonding properties, as this is the preferred basic monomer system. However, substantial increases of hardness in the other monomer systems illustrated in Table I are also obtained by including the N-tert.-butylacrylamide in the system. Acrylate pressure-sensitive adhesives formed from 2-ethylhexyl acrylate, vinyl acetate and N-tert.-butylacrylamide have been found to be particularly good for use as surgical pressure-sensitive adhesives in that these pressure-sensitive adhesives are found to have excellent skin adhesion even over extended periods of wear. This appears to be true whether or not the polymerization is carried out in an aliphatic solvating medium or in the conventional solvating systems, such as ethyl acetate. Also the pressure-sensitive adhesives

TABLE II

| Polymer Composition | Ratio Cyclohexane to Monomer | Polymer Plasticity, mm. |
|---|---|---|
| 63% 2-ethylhexyl acrylate, 37% vinyl acetate | 47/53 | 1.08 |
| 62% 2-ethylhexyl acrylate, 36% vinyl acetate, 2% acrylamide | 55/45 | 1.61 |
| 61% 2-ethylhexyl acrylate, 35% vinyl acetate, 4% acrylamide | 55/45 | (¹) |
| 60% 2-ethylhexyl acrylate, 35% vinyl acetate, 5% acrylic acid | 50/50 | 1.88 |
| 57% 2-ethylhexyl acrylate, 33% vinyl acetate, 10% acrylic acid | 40/60 | (¹) |
| 57% 2-ethylhexyl acrylate, 33% vinyl acetate, 10% N-tert.-butylacrylamide | 50/50 | 1.65 |
| 53% 2-ethylhexyl acrylate, 32% vinyl acetate, 15% N-tert.-butylacrylamide | 40/60 | 2.53 |
| 50% 2-ethylhexyl acrylate, 30% vinyl acetate, 20% N-tert.-butylacrylamide | 40/60 | 2.95 |

¹ Polymer precipitated.

formed from the 2-ethylhexyl acrylate-vinyl acetate-N-tert.-butylacrylamide terpolymer appear to have the peculiar property that when spread onto woven backing fabrics formed of rayon, the pressure-sensitive adhesive appears to substantially improve the tear characteristics of the resulting pressure-sensitive adhesive tape as compared to the tear characteristics of rayon-backed adhesive tapes where the pressure-sensitive adhesive is some other acrylate polymer or a rubber-base pressure-sensitive adhesive.

As the terpolymer system of 2-ethylhexyl acrylate, vinyl acetate and N-tert.-butylacrylamide illustrates the preferred practice of the present invention, further illustration of the practice of the present invention will be given with specific reference to this particular polymer system. In making the terpolymers, the monomer reactants are preferably present in amounts of 45 to 65 weight percent 2-ethylhexyl acrylate, 20 to 40 percent vinyl acetate, (that is, 1.1 to 3.3 parts by weight of 2-ethylhexyl acrylate for each part by weight vinyl acetate present) and 10 to 25 perecent of the N-tert.-butylacrylamide. The polymerization is also preferably carried out in cyclohexane, the preferred aliphatic solvating medium. The wide range of plasticities of the resulting pressure-sensitive adhesive is well illustrated in the accompanying drawing in which there are curves showing the effect of the cyclohexane concentration in the solvating medium on the resulting plasticity of the pressure-sensitive adhesive for two different concentrations of the N-tert.-butylacrylamide. It will be noted that as the concentration of the cyclohexane in the reaction is decreased, the hardness of the resulting polymer is increased. The following examples, which are for the purpose of illustration only, further illustrate the polymerization of relatively hard terpolymer adhesive compositions and the use of such acrylate adhesive compositions on plasticized film backing.

*Example I*

A five-liter, three-necked flask is set up with a water condenser, a mechanical stirrer, a thermometer and a gas inlet tube. The flask is placed in an oil bath which is heated electrically. To the flask is added 375 grams of 2-ethylhexyl acrylate, 225 grams of vinyl acetate, 150 grams of N-tert.-butylacrylamide and 500 grams of cyclohexane. The reaction mixture is heated to a temperature of 75° C. during a 30-minute period while the air in the flask is displaced with a slow stream of nitrogen. Nitrogen flushing is then discontinued and 3.75 grams of benzoyl peroxide is added. A vigorous exothermic polymerization ensues. Stirring, and heating at 80–85° C., is continued for 18 hours during which the reaction mixture becomes thick. Cyclohexane (630 grams) is then added. Stirring and heating are continued for 2.5 hours longer, at which time an additional 265 grams of cyclohexane is added to reduce the viscosity of the reaction mixture to a value suitable for coating. The reaction is then discontinued and the solution is cooled. The solids content of the reaction mixture is found to be 34.9 percent. A sample of the polymer, obtained by evaporating the cyclohexane solvent, is found to have a standard Williams plasticity of 3.02 mm. The polymer is colorless and has good pressure-sensitive adhesive characteristics.

*Example II*

Plasticized vinyl film, 2.5 to 3.5 mils in thickness, is prepared by casting an organosol of the following composition on a suitable coated paper carrier, evaporating the solvent, and fusing the film at a temperature of 400° F.

| | Parts by weight |
|---|---|
| Geon 121 | 1980 |
| Plasticizer NP–10 | 832 |
| Paraplex G–50 | 34 |
| Dibutyl tin maleate | 14 |
| Stabilizer A–5 | 14 |
| Diisobutyl ketone | 326 |

The cyclohexane solution of the pressure-sensitive acrylic polymer of Example I is coated on the film and the cyclohexane is evaporated by passage of the film through an oven. The solution is applied at a thickness such that the final weight of dried acrylate on the film is 1.0 ounce per square yard. No absorption of the cyclohexane by the film occurs during the coating operation.

Strips of film coated with the acrylic adhesive are sterilized with ethylene oxide at temperatures of from 160–200° F. After sterilization, the tack, the cohesive strength, and the ability of the adhesive to adhere to human skin are excellent. The sterilized adhesive is softer than the original because of migration of some NP–10 plasticizer from the film. The good adhesive characteristics of the sterilized strips are essentially the same after several months of aging at room temperature.

In the above composition for forming the vinyl film backing, the Geon 121 is a dispersion grade polyvinyl chloride homopolymer, the NP–10 and Paraplex G–50 are intermediate molecular weight polyester plasticizers, and the stabilizer A–5 is a monomeric low molecular weight diepoxide formed by condensing epichlorohydrin with Bis Phenol-A.

Having thus described my invention, I claim:

1. A terpolymer pressure-sensitive adhesive composition comprising 45 to 65 percent by weight 2-ethylhexyl acrylate, 20 to 40 percent by weight vinyl acetate, and 10 to 25 percent by weight N-tert.-butylacrylamide, said pressure-sensitive adhesive having a plasticity in excess of 1.50 mm.

2. A terpolymer pressure-sensitive adhesive of claim 1 having a plasticity of 1.50 to 3.50 mm.

3. The method of increasing the hardness of tacky acrylate polymer formed from a monomer mix of the group consisting of (a) 2-ethylhexyl acrylate and vinyl acetate, (b) 2-ethylhexyl acrylate and methyl acrylate, (c) 2-ethylhexyl acrylate and methyl methacrylate, (d) lauryl methacrylate and methyl methacrylate, and (e) lauryl methacrylate and methyl acrylate when polymerized in cyclohexane, which comprises including in the monomer mix of said group during polymerization 2 to 25 percent by weight of N-tert.-butylacrylamide based on the total monomer content.

4. Adhesive sheet material comprising a film backing containing an acrylate pressure-sensitive adhesive in which the pressure-sensitive adhesive is an acrylate terpolymer comprising 45 to 65 weight percent 2-ethylhexyl acrylate, 20 to 40 percent vinyl acetate, and 10 to 25 percent N-tert.-butylacrylamide said pressure-sensitive adhesive having a plasticity of at least 1.50 mm. and said acrylate pressure-sensitive adhesive and said film backing being substantially free of any solvent.

5. Adhesive sheet material of claim 4 in which said backing is a plasticized film backing containing a polymeric plasticizer.

6. An adhesive sheet material of claim 5 in which said backing is a plasticized polyvinyl chloride film and in which said adhesive after equilibrium has a plasticity of 1.50 to 2.50 mm.

References Cited

UNITED STATES PATENTS

| | | |
|---|---|---|
| Re. 24,906 | 12/1960 | Ulrich. |
| 2,877,141 | 3/1959 | Shelley et al. |
| 2,973,286 | 2/1961 | Ulrich. |
| 3,037,955 | 6/1962 | Carman. |
| 3,189,581 | 6/1965 | Hart et al. |

OTHER REFERENCES

Buttrey: Plasticizers, Franklin Publishing Company, 1960, pp. 150–152.

MORRIS LIEBMAN, *Primary Examiner.*

L. T. JACOBS, *Assistant Examiner.*